Figure 1:
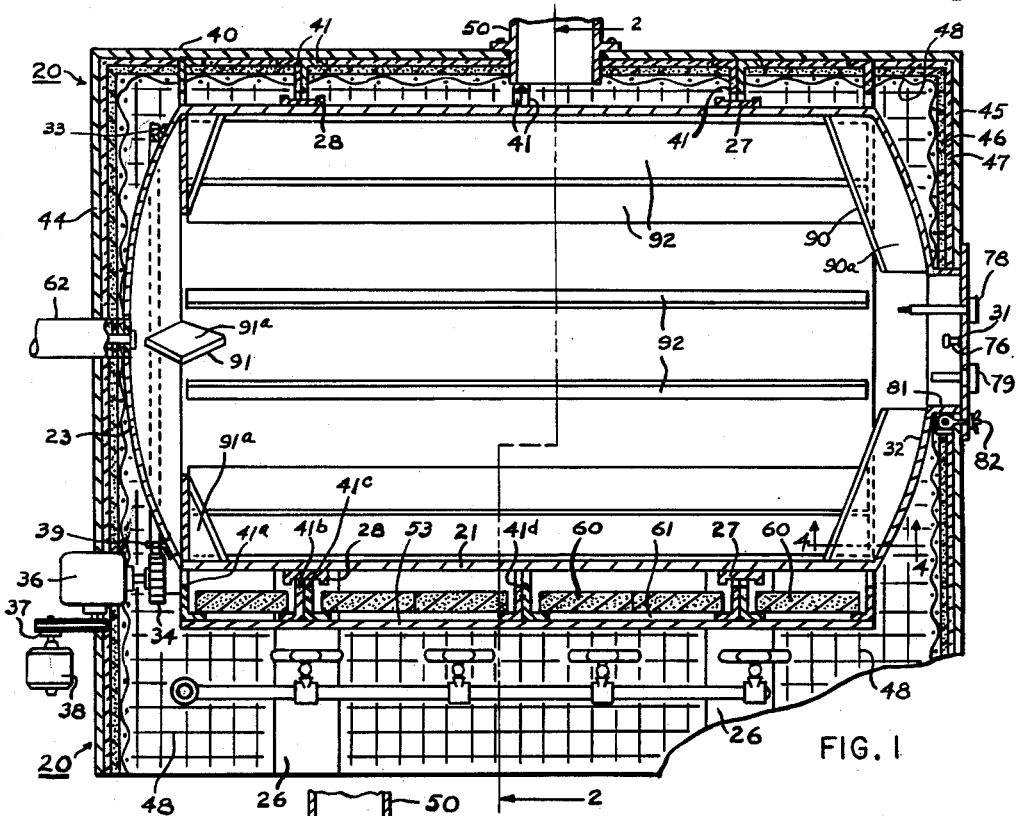

Aug. 25, 1964    E. F. FRONDORF    3,146,109
PROCESS FOR PRODUCING BROWN FLOUR
Filed Oct. 4, 1962    2 Sheets-Sheet 1

INVENTOR.
EDWARD F. FRONDORF
BY Pearce and Schaeperklaus
Attorneys

Aug. 25, 1964     E. F. FRONDORF     3,146,109
PROCESS FOR PRODUCING BROWN FLOUR
Filed Oct. 4, 1962                                                 2 Sheets-Sheet 2
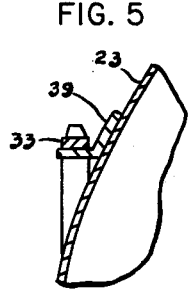
FIG. 5
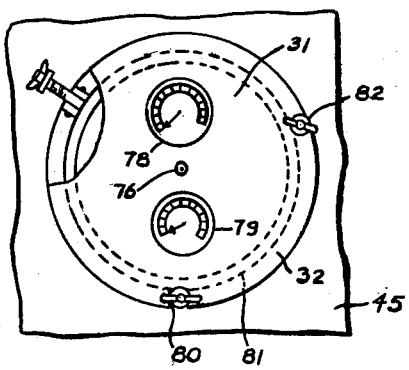
FIG. 6
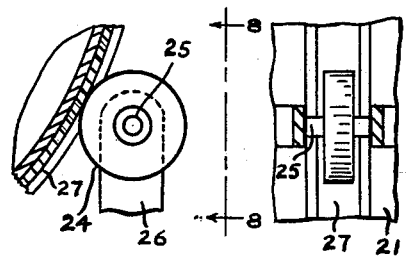
FIG. 7
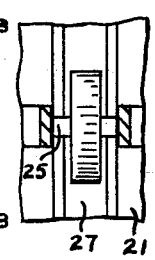
FIG. 8
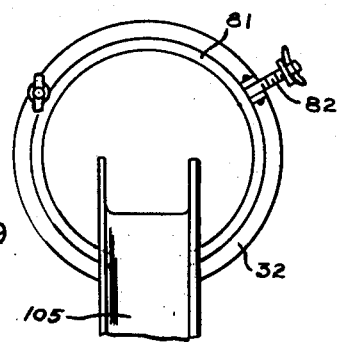
FIG. 9
FIG. 11
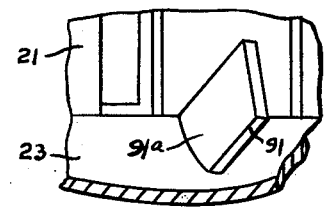
FIG. 10
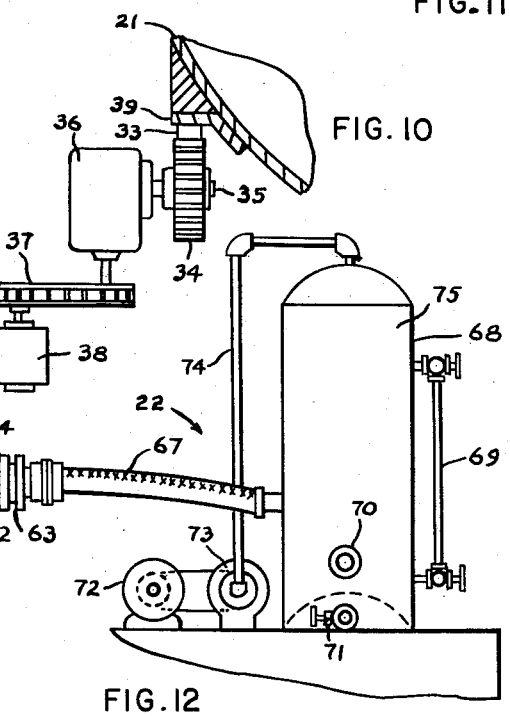
FIG. 13
FIG. 12
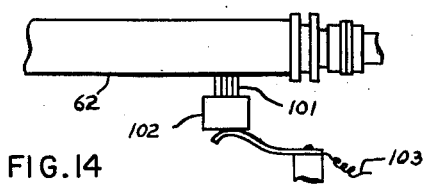
FIG. 14
INVENTOR.
EDWARD F. FRONDORF
BY
Pearce and Schaeper Klaus
Attorneys United States Patent Office 3,146,109
Patented Aug. 25, 1964

3,146,109
PROCESS FOR PRODUCING BROWN FLOUR
Edward F. Frondorf, Delhi Township, Hamilton County,
Ohio (5776 Delhi Road, Cincinnati 33, Ohio)
Filed Oct. 4, 1962, Ser. No. 228,317
6 Claims. (Cl. 99—93)

This invention pertains to brown flour, and, in particular, is directed to an apparatus in which flour is browned or toasted, a process by which flour is browned, and the product as the result of the operation and use of such apparatus and process.

In the past, there has been an effort to brown flour, however, none of the apparatuses or processes involved has ever achieved worthwhile success on a commercial or other basis. Nor is it believed that in prior attempts to obtain brown flour, the milled flour that I presently process and having the hereinafter described quality and characteristics was used. To my knowledge, there has never been such a food product available in food markets or to institutional trade such as restaurants, hotels, etc. Nor am I cognizant of any forms of preparation of brown flour being presently practiced. It appears to me that the knowledge of obtaining a consistently uniformly-colored brown flour of high quality by mechanical means as contemplated by our patent laws, has never been realized until my invention.

After experimentation with different types of milled flours, I have discovered that under certain operating conditions imposed upon my process, and using a quality high-gluten flour having certain characteristics, I am able to obtain consistently uniformly-colored batches of flour, without scorching thereof or without partial toasting. The result is a stable, sterile product which will keep for a considerable length of time which is in turn extended when a vacuum system is included in the practice of my invention. In other words, the flour is toasted in an atmosphere which may or may not have a free access of air, but nevertheless provides for the removal of a moisture content required for the proper toasting of the flour.

An object of my invention, therefore, is to provide for a new product of brown flour.

Another object of my invention is to provide for a novel apparatus by which brown flour is obtained.

A further object of my invention is to provide for a novel process by which such brown flour is obtained.

Another object of my invention is to provide for a processing operation which is efficient and reliable and in which the process of relatively large amounts of the product in a relatively short time is relatively simple.

Another object of this invention is to provide for a brown flour which does not contribute to a "gravy break" in gravy, or to contribute to the gravy becoming lumpy, as occurs with the use of white bleached flour. "Gravy break" is a condition of gravy in which the water in the gravy separates from the greases and fats of the cooked meats used with flour in making gravy. My invention has the advantage of producing a brown flour which does not contribute to "gravy break" or to separation after the gravy begins to cool. Moreover, the gravy made with my brown flour may be refrigerated and later re-used, as good as originally used.

Figure 2:
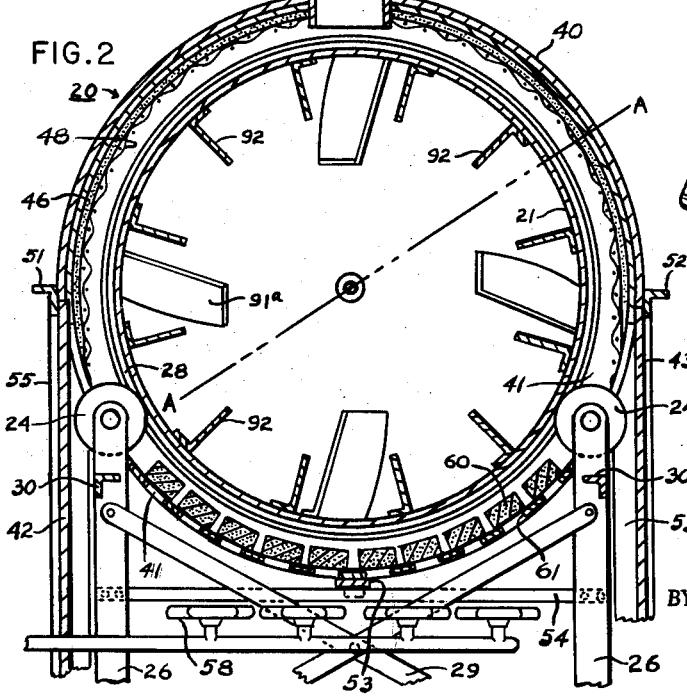
Figure 3:
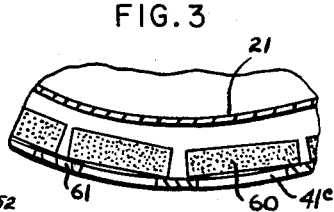
Figure 4:
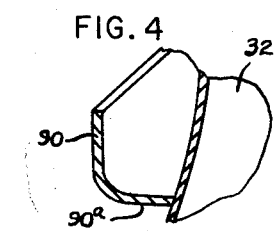

In the figures of the drawing, reference characters refer to like characters in the specification, and in which:

FIG. 1 is a sectional elevation of an oven;
FIG. 2 is a sectional view taken on line 2—2 of FIG. 1;
FIG. 3 is a schematic view of a portion of the structure of the oven;
FIG. 4 is a view taken on line 4—4 of FIG. 1;
FIG. 5 is a fragmentary view of a ring gear mounted on the drum of the oven;
FIG. 6 is a full view of a door mounted on the loading and unloading end of the drum;
FIG. 7 is a fragmentary view of a trunnion and support on which the drum rotates;
FIG. 8 is a view taken on line 8—8 of FIG. 7;
FIG. 9 is a fragmetnary view of the loading end of the oven;
FIG. 10 is a plan view of a drive mechanism for the ring gear mounted on the drum;
FIG. 11 is a fragmentary view of an interior portion of the drum;
FIG. 12 is an elevational view of a vacuum system adapted to the oven at its rear end;
FIG. 13 is a fragmentary sectional view of the insulation and housing for the oven; and
FIG. 14 is a fragmentary view of the apparatus.

The device in which I carry out the operation of my invention is generally shown in FIGS. 1, 2, and 12.

The oven comprises an insulated housing 20 having a rotating drum 21 mounted therein, with a vacuum system 22 attached to an end 23 of drum 21 and having access to the interior of drum 21. Drum 21 is supported upon each of four trunnions 24, each of which has suitable bearings 25 (FIG. 8) and secured to one of four vertical stands or supports 26. Each opposed pair of trunnions is adapted to engage one of a pair of running bands 27, 28, each of which is welded upon the outer periphery of drum 21 at suitable locations along its length. The engagement of trunnions to bands restricts longitudinal movement of drum 21. Standards 26 may be insulated in view of the heat generated for the oven during a processing cycle.

Cross-braces 29 are bolted or otherwise secured to opposed pairs of vertical standards 26, as shown in FIG. 2, to prevent drum 21 from slipping downwardly in between such standards during rotation of the drum. Suitable longitudinally extending supporting ribs 30 may be fastened between the upper extremes (FIG. 2) of each of a pair of standards 26 that are on one side of drum 21, as well as being fastened between the lower extremes of such standards 26 (not shown), to complete an assembly of a suitably rigid frame to support trunnions 24 and drum 21 mounted thereon. A hatch or door 31 (FIG. 6) is secured to the loading and unloading end 32 of drum 21.

A ring gear 33 is mounted concentrically to the dished out or convexed shell 23 constituting the rear end of drum 21, and is driven by means of a pinion drive gear 34 mounted on a shaft 35 attached to a speed reducer 36 (FIGS. 1 and 10). By means of a pulley and pulley belt connection 37, a three-phase, 60 cycle, 3 H.P. 220 volt reversible motor 38 drives such speed reducer 36 and ring gear 33, and in turn rotates the drum 21 freely revolvable on trunnions 24. As shown in FIGS. 5 and 10 ring gear 33 is secured to a bracket 39 welded to shell 23. Motor 38 is a variable speed motor for the purpose of increasing the speed of drum 21 during the unloading of the processed flour, in which case the use of the speed reducer may be by-passed or modified.

The insulated housing 20 comprises a metal casing 40 surrounding drum 21 on all its sides and top, and extends to ground or floor level. Casing 40 is bolted around and to the upper half of a plurality of angle-iron hoops 41 disposed longitudinally of the oven in spaced parallel arrangement, and also extends vertically to the floor all around the oven by means of panels 42 and 43 and by ends 44, 45 of the housing. Insulation comprising fiber glass 46 and asbestos sheeting or paper 47 (FIG. 13) is mounted within the spaced arrangement between each of hoops 41 and is held within the radial flanges thereof by means of each of the hoops' outer flanges and a wire screen mesh 48 extending the length of the oven and suitably secured to the radial flanges of the hoops 41. The insulation about the ends 44, 45 of housing 40 is secured thereto by suitable means (FIG. 13) such as a U-shaped copper wiring 49 whose legs are inserted through apertures in such ends 44, 45 after which they are bent or twisted upon such ends. A flue 50 is provided in housing 20 for the escape of spent gas or other residue of the heating means used to fire the oven.

Hoops 41 are maintained in a vertical position by means of three horizontally disposed angle-iron supporting bars 51, 52, 53, and a frame bar 54 extending across one pair of opposed vertical supports 26. The three bars are bolted to the exterior flanges of each of the hoops 41 and extend the length of the right cylindrical portion of drum 21. Bars 51 and 52 are mounted at the extreme widths of casing 40, while bar 53 is mounted lowermost of the hoops, as shown in FIGS. 1 and 2. Cross-support 54 is bolted or secured between opposed standards 26 on either end of the drum, and is also securely connected to bar 53, to prevent any one of the hoops 41 from swinging or pivoting on supports 51 and 52.

Bars 51, 52 also constitute a portion of a structural frame for housing 20. Such bars are suitably mounted and secured upon or to vertical legs 55 situated in each corner of housing 20, with conventional struts and cross-braces (not shown) attached between lower portions of adjacent legs 55. A rigid and stationary assembly of drum relative to housing is thereby obtained through the aforesaid interrelationship of the frames of drum and housing. Supports 51 and 52 are sufficiently elevated from ground or floor level, to enable drum 21 to rotate freely on its trunnions 24 and to provide space for heating means such as a plurality of gas burners 58 to be disposed below the drum. An access door 59 (FIG. 2) is provided in paneling 42 of casing 40 for access to burners 58 which may be cleaned or removed.

Hoops 41 provide supporting means for a fire brick arch work 60 comprising rows of fire brick (FIGS. 1 and 2) disposed between the heating means 58 and the rotating drum 21. An arched row of brick extending laterally below the drum is supported by the outer peripheral flanges of a single pair of hoops 41a and 41b along the end faces of each brick, as shown in FIG. 1, or should it be desired to space hoops 41 farther apart from each other, such as shown at 41c, 41d, a slat or slats 61 (FIGS. 1 and 3) may be welded between the opposed outer flanges of hoops 41c, 41d to provide for additional support for the individual bricks between such hoops 41c, 41d.

The drum 25 includes a metallic right cylindrical portion at each end of which dished out spherical sections 23 and 32 are welded for the purpose of withstanding a vacuum created by the vacuum system 22. As shown in FIG. 12, shell 23 has extending therefrom through oven end 45 a circular flange 62 to which is attached a revolving rotary joint 63 provided for connection of vacuum system 22 to oven 20. Within flange 62, a filter 64 consisting of fiber glass discs is disposed and held therein by means of a nut or washer 65 screwed or welded to a shaft 66 mounted in flange 62. Rotary joint 63 is secured to flange 62, and its non-rotating end is connected to a flexible hose 67 running to a tank 68. Tank 68 provides for a water gauge 69 to indicate that the water level is above the ingress of air or vacuum from flexible hose 67. A water inlet cap 70 and drain valve 71 is also provided in tank 68. A motor 72 drives a vacuum pump 73 to which is attached a conduit 74 connected to the air reservoir 75 in tank 68. As drum 21 rotates, and vacuum system 22 is operating, moisture and the volatile vapors from the flour are liberated therefrom during the process, and as the result of a lesser pressure being induced in reservoir 75 than in drum 21, the moisture and oil vapors are drawn in a stream of air out of the drum into tank 68. Ten inches of mercury obtained in the vacuum system is sufficient negative pressure for this purpose. A ¼" needle air valve 76 (FIG. 6) is ample provision in loading door 31 of drum 21, to maintain and control a slight air current through drum 21 on which the moisture and the volatile oil vapors liberated from the flour by heat may pass to the filter 64 and vacuum system 22. Mounted on door 31 are a thermometer 78 and vacuum gauge 79 which project into drum 21 for their respective purposes of indicating interior drum temperature and vacuum. For ease of attaching and removing door 31 from drum 21, a plurality of spaced peripheral notches 80 is provided on door 31 (FIG. 6) and which correspond to a like number of threaded swing bolts and wingnuts 82. Such swing bolts are hinged on a circular flange 81 in shell 32 and are adapted to be swung into such notches of door 31 and thereafter secured thereto by tightening the wingnuts.

In operation of the oven, motor 38 through its linkage connections to pinion gear 34, drives ring gear 33 and thereby rotates drum 21. Drum 21 freely rotates on its trunnions 24 engaging bands 27. When vacuum system 22 is utilized in the browning process, of course, the moisture and oil vapors are withdrawn through the rear of the drum.

During a counter-clockwise rotation of drum 21 while the milled flour is being processed, as viewed from its loading end, a plurality of discharge scoops 90 (FIGS. 1 and 4) welded or otherwise mounted interiorly upon shell 32 with each having a portion thereof projecting into the right cylindrical section of drum 21, remain inoperative since they are inverted with respect to the falling movement of the flour. Any flour which accumulates on the inverted bottom 90a (FIG. 4) of scoops 90 will be returned to the cylindrical portion for further agitation and mixing after such scoops rotate from the maximum angle of repose for the flour. Further, a plurality of dislocators 91 are mounted interiorly of shell 23. Each dislocator has a face 91a a portion of which projects into the right cylindrical portion of drum 21 to return flour accumulated in shell 23 to the cylindrical portion of the drum. A dislocator 91 comprises a plane-like element, shown in FIGS. 1, 2, and 11, which is welded to adjacent portions of shell 23 and the cylindrical portion of the drum. Each dislocator 91 is so welded that face 91a is situated in an askewed manner, to the axis of shell 23, i.e., so that as drum 21 rotates counterclockwise and flour accumulates or packs in shell 23, the flour will fall upon a face 91a. As face 91a elevates during the drum rotation, it turns into the maximum angle of repose for the flour thereon. The flour will then gravitate inwardly of the drum from face 91a and dump into the cylindrical portion of the drum for further exposure to agitation during the browning process. A plurality of agitating means or webs 92 are provided along the longitudinal interior surface of drum 21 to agitate the flour during processing, as shown in FIGS. 1 and 2.

I have found that an oleo resin layer applied to the interior drum surface and to the agitating means about which the flour agitates provides for a dual function, in that corrosion of the drum is prevented and the possibility of adhesion of flour to the surface is removed. A favorable economical cost factor also arises with the use of an oleo-resin lined drum.

The purpose of firebrick arch work 60 is to prevent the formation of peripheral rings of greater heat intensity or hot spots along a particular circumferential portion of drum 21 than along other intermittent portions of the drum, and to distribute the heat of burners 58 evenly across the rotating drum. Otherwise, such rings or hot spots conduct heat to the flour unevenly thereby resulting in different portions of the batch being scorched and others partially browned. The length of arch work 60 measured along the length of drum 21 is preferably the same length as the rows of burners 58 or other heating means thereby assuring the result of even distribution of heat. Also, the width of the firebrick is as wide as there are rows of burners 58. The flame of burners 58 should not directly impinge upon any portion of the firebrick arch in order to prevent the formation of soot about the oven or drum.

thereby obviating the inclusion of foreign matter in the sterile product of brown flour.

The heating means provided is adapted to uniformly heat the flour and the interior of the drum to 300° F. during the first phase of process which extends over a period of substantially two hours during which time the flour is dehydrated and the moisture is removed from the drum by the vacuum. In the event that a vacuum system is not utilized the moisture escapes from the drum through needle valve 76 or by other suitable means that may be provided in the closed drum.

The second phase comprises maintaining the temperature of the flour and interior of the drum at 300° F. for a period extending over substantially one hour and twenty to thirty minutes during which time the oil vapors are liberated or distilled from the flour and are either removed by vacuum, evaporate, or otherwise escape from the drum in a similar fashion as does the moisture when a vacuum system is not used.

A continuous feed of flour and removal thereof, does not provide for adequate control of the operating conditions by which the high-gluten flour is processed and browned. By my method, whether a vacuum system is utilized or not, each and every particle of flour is thoroughly browned. This is amply illustrated by the fact that many balls of flour, sizes of which vary as high as ¾ inch in diameter, are formed during the process and later sifted from the granulated browned flour. The breaking or pulverizing of each of these balls clearly shows that each of such balls is thoroughly browned and needs only to be pulverized to be included in the remaining bulk of the browned flour. A hammermill is suitable for the pulverization of the brown flour balls.

The flour used in this invention contains from 12% to 16% gluten, which is considered a flour of high gluten content, a moisture content of approximately 13%, and includes volatile oils content of substantially 1.84% by weight.

The moisture content of the flour is, of course, removed from the flour during toasting, and the weight of a given batch of flour processed by my invention is reduced by approximately one-sixth of its total weight before browning the batch.

A uniform motion of agitation of a batch of flour provides the best results. I have found that by revolving drum 21 at the rate of 1.2 revolutions per minute that the flour is adequately exposed to heat during the cycle. The rim speed of the drum is an important factor since in one revolution of the drum, the flour directly contacts the heated drum 21 over substantially a 180° angle of the rotating drum. This 180° angle is substantially stationary with respect to the oven, as indicated by line A—A. Thus, for a particular number of seconds throughout a processing cycle, not consecutive in time, the flour directly contacts the heated drum. Should this time in each revolution of drum 21 be too long, scorching or burning of the flour ultimately occurs. If too short in any one revolution, the flour is not adequately toasted during a processing cycle. In this latter event, experience has shown that the total time involved exceeds the three hours and twenty to thirty minutes required in my process, and that such total time is completely indefinite and will vary widely, depending upon the particular quantity of flour in the oven for the cycle. Such a condition is highly impractical and particularly so for purposes of commercial production of browned flour.

It should be understood that line A—A in FIG. 2 is not necessarily inclined at the exact angle shown in every cycle of processing. Line A—A is primarily shown to outline substantially the configuration of the boundaries the flour takes while drum 21 is rotating. Also, the level of the flour in any one cycle need not necessarily coincide with line A—A but rather be generally parallel thereto.

In the case of different sized drums being used, the rim speed of each will vary accordingly although the 1.2 revolutions per minute of each drum remains the same, in order that the flour is exposed to the particular heated drum for the same time as it would be exposed in another sized drum. Although a greater amount of flour is processed in a drum having a larger cylindrical surface area, substantially the same amount of time is required in the operation of such a drum as is required for a drum having a smaller cylindrical surface area, and therefore its rim speed is correspondingly greater in order to effect substantially the same predetermined period of time as that in the smaller drum.

During a processing cycle, the particles of flour remain in friction with each other thereby resulting in an accumulation of electrostatic charges among and between such particles. Were this condition allowed to continue to exist, such charge would build up in quantity and in time, flash or arc across the walls of drum 21, resulting in an explosion. Therefore, in the actual construction of the oven, a carbon brush 101 is mounted in a receptacle 102 which is spring-biased against flange 62 at the rear of the drum (FIG. 14). Such receptacle and brush are suitably mounted to flange 62 and lead to ground by means of a wire 103, thereby passing or leaking off any accumulated charge on the particles of flour through the drum 21 itself. As flange 62 integrally rotates with drum 21, carbon brush 101 biased thereagainst picks up any static electricity developed in the drum.

For the purpose of unloading drum 21 of processed flour, one end thereof is tilted upwardly, say, by means of block and pulley, and the rotation of the drum is reversed. In this manner, scoops 90 become operative whereby the browned flour tumbles into such scoops, and as each scoop revolves into a higher angle with drum 21, the flour in each scoop discharges into chute 105 (FIG. 9) projecting through the doorway provided by removal of door 31 and into the drum.

While the invention has been described and illustrated by the embodiments shown, it is not intended to be strictly limited thereto, and other variations and modifications may be employed within the scope of the following claims.

Therefore, I claim:

1. The process of consistently obtaining a uniformly browned flour comprising the steps of loading an unheated drum adapted to be rotated with a high gluten flour batch the quantity of which in said drum is so proportioned as to prevent scorching and under-browning thereof as the drum is rotated at a constant speed under controlled time and temperature conditions, rotating said drum at a constant speed of 1.2 revolutions per minute, agitating the flour in said drum, uniformly raising the temperature within the rotating drum to substantially 300° F. over a period of two hours whereby dehydration of the entire batch of flour is accomplished, and maintaining such temperature thereafter for a period of approximately 80 minutes whereby said entire batch of flour is uniformly browned.

2. The process of claim 1 further characterized by the step of uniformly raising the temperature within the rotating drum by heating said drum through a fire brick arch work in association with said drum.

3. The process of claim 1 including the step of maintaining a vacuum imposed upon the interior of the drum while said drum is being rotated.

4. The process of uniformly browning a high gluten flour batch comprising rotating a drum containing said batch at a speed of 1.2 revolutions per minute, agitating the flour in said drum, uniformly heating the drum through a fire brick arch work in association therewith by raising the temperature of the drum interior to 300° F. over a period of substantially 120 minutes thereby removing substantially all the moisture content from said batch, and holding the temperature at substantially 300° F. for 80 minutes whereby the dehydrated flour is toasted to a uniform brown texture.

5. The process of claim 4 wherein the interior surface of the drum is lined with a non-toxic resin.

6. The process of uniformity browning a high gluten flour batch comprising rotating a drum containing said batch at a speed of 1.2 revolutions per minute, agitating the flour in said drum, uniformly heating the drum through a fire brick arch work in association therewith by raising the temperature of the drum interior to 300° F. over a period of substantially 120 minutes thereby removing substantially all the moisture content from said batch, and holding the temperature at substantially 300° F. for 80 minutes whereby the dehydrated flour is toasted to a uniform brown texture having a resultant weight characterized by a reduction of approximately one sixth of its total weight before browning.

References Cited in the file of this patent

UNITED STATES PATENTS

| | | |
|---|---|---|
| 1,035,842 | Anderson | Aug. 20, 1912 |
| 1,079,676 | Wallos | Nov. 25, 1913 |
| 1,203,175 | Blacklock | Oct. 31, 1916 |
| 2,848,332 | Fabish | Aug. 19, 1958 |